(12) United States Patent
Sanchez

(10) Patent No.: US 6,954,458 B1
(45) Date of Patent: Oct. 11, 2005

(54) SYSTEM AND METHOD FOR MESSAGE TRANSPORT AND SEGMENTATION

(75) Inventor: Eduardo T. Sanchez, Saltillo (MX)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/395,078

(22) Filed: Sep. 13, 1999

Related U.S. Application Data
(60) Provisional application No. 60/104,929, filed on Oct. 20, 1998.

(51) Int. Cl.[7] .......................... H04L 12/50; H04L 12/28; H04M 7/00
(52) U.S. Cl. .................. 370/385; 370/401; 379/221.08; 379/230
(58) Field of Search ................................ 370/230, 249, 370/385, 389, 401, 467, 522, 524, 252, 352, 237, 428; 379/112.04, 10.65, 112.05, 23, 112.1, 9.01, 221.08, 31, 221.09, 221.12, 221.01, 221.02, 201.01, 114.28, 114.29, 213.01, 230, 221.1; 714/4, 33; 707/1, 104.1, 10, 9

(56) References Cited

U.S. PATENT DOCUMENTS

| | | | | |
|---|---|---|---|---|
| 4,979,118 A | * | 12/1990 | Kheradpir | 379/221.08 |
| 5,008,929 A | * | 4/1991 | Olsen et al. | 379/114.29 |
| 5,042,064 A | * | 8/1991 | Chung et al. | 379/112.04 |
| 5,067,074 A | * | 11/1991 | Farel et al. | 370/230 |
| 5,084,816 A | * | 1/1992 | Boese et al. | 714/14 |
| 5,255,315 A | * | 10/1993 | Bushnell | 379/221.01 |
| 5,278,823 A | * | 1/1994 | Handel | 370/249 |
| 5,546,398 A | * | 8/1996 | Tucker et al. | 370/467 |
| 5,555,396 A | | 9/1996 | Alferness et al. | 395/474 |
| 5,592,477 A | * | 1/1997 | Farris et al. | 370/401 |
| 5,661,782 A | * | 8/1997 | Bartholomew et al. | 379/221.08 |
| 5,701,301 A | * | 12/1997 | Weisser, Jr. | 370/428 |
| 5,708,702 A | * | 1/1998 | De Paul et al. | 379/221.1 |
| 5,721,728 A | | 2/1998 | Fowler et al. | |
| 5,737,517 A | * | 4/1998 | Kite et al. | 714/33 |
| 5,787,147 A | * | 7/1998 | Gundersen | 379/9.01 |
| 5,898,667 A | * | 4/1999 | Longfield et al. | 370/225 |
| 5,901,359 A | * | 5/1999 | Malmstrom | 379/221.12 |
| 5,915,013 A | * | 6/1999 | Mintz et al. | 379/230 |
| 5,926,482 A | * | 7/1999 | Christie et al. | 379/230 |
| 5,933,490 A | * | 8/1999 | White et al. | 379/221.01 |
| 5,940,492 A | * | 8/1999 | Galloway et al. | 379/230 |

(Continued)

FOREIGN PATENT DOCUMENTS

| | | | | |
|---|---|---|---|---|
| EP | 000781058 A2 | * | 6/1997 | H04Q/3/00 |
| EP | 0 840 531 A2 | | 6/1998 | |
| WO | WO 97/28627 | | 7/1997 | |

OTHER PUBLICATIONS

Jabbari, Routing and Congestion Control in Common Channel Signaling System No. 7, IEEE 1992, p. 607-6-17.*

*Primary Examiner*—Duc Ho
*Assistant Examiner*—Phuongchau Ba Nguyen

(57) ABSTRACT

A node, and a system including a first node, supporting message transport and segmentation in a communications network having a plurality of nodes, comprising a memory including a database for storing a plurality of segmentation support capability test results, wherein the memory further includes a program module adapted to send a first segmented message, a first segmentation support test message, and a first segmentation support response message, and to receive a second segmented message, a second segmentation support test message, and a second segmentation support response message. The system also includes a second node in electronic communication with the first node, wherein the second node is adapted to receive the segmentation support response message including the segmentation support capability result.

16 Claims, 3 Drawing Sheets

U.S. PATENT DOCUMENTS

| | | | |
|---|---|---|---|
| 5,983,217 A | * 11/1999 | Khosravi-Sichani et al. | 707/10 |
| 6,028,914 A | * 2/2000 | Lin et al. | 379/221.1 |
| 6,078,584 A | * 6/2000 | Mottishaw et al. | 379/213.01 |
| 6,122,255 A | * 9/2000 | Bartholomew et al. | 370/352 |
| 6,134,314 A | * 10/2000 | Dougherty et al. | 379/221.09 |
| 6,137,806 A | * 10/2000 | Martinez | 370/428 |
| 6,286,011 B1 | * 9/2001 | Velamuri et al. | 707/9 |
| 6,317,733 B1 | * 11/2001 | Lehtinen | 707/1 |
| 6,608,893 B1 | * 8/2003 | Fleming et al. | 379/230 |

* cited by examiner

SYSTEM AND METHOD FOR MESSAGE TRANSPORT AND SEGMENTATION

CROSS REFERENCE TO RELATED APPLICATION

Reference is made to U.S. Provisional Application for patent Ser. No. 60/104,929, filed on Oct. 20, 1998, from which priority is claimed and which is hereby incorporated by reference in its entirety.

BACKGROUND OF THE INVENTION

1. Technical Field of the Invention

The present invention relates to networked communications systems, and in particular, to apparatus and methods operating within a communications network providing the ability to transport long messages via segmentation capability testing.

2. Description of Related Art

Within a communications network messages are passed between terminal points, which may also be characterized as nodal entities. The usual order of communication involves a message sent from a first node to a second node, and a response or reply to the initial message, sent back from the second node to the first node. For various reasons, such as the presence of excessive electronic noise or a physical fault in the network, the response may never reach the first node.

Timers have been built into network nodes to ensure that the failure to receive a response does not result in network inactivity for an indefinite period. That is, when a message is sent from one node to another, a timer within the sending node is typically started and allowed to run for a preselected period of time. If no response is received before the timeout period (i.e., when the timer counts down to a value of zero), then the sending node is alerted to this fact and appropriate recovery measures can be taken.

One reason for the failure of nodes in a network to receive a response is the existence of increasingly sophisticated application software, which requires sending messages exceeding the limits established by current standards. For example, the Common Channel Signaling System No. 7 (SS7) standard is a global standard for telecommunications defined by the International Telecommunication Union Telecommunication Standardization Sector (ITU-T) and the American National Standards Institute, Committee T-1 (ANSI T-1). The SS7 standard defines procedures and protocol wherein network elements in the Public Switched Telephone Network (PSTN) exchange information over a digital signaling network to effect wireless (i.e., cellular) and wireline call set up, routing, and control. SS7 messages are exchanged between network elements, or nodes, over bidirectional channels called signaling links. The signaling points, or nodes, in an SS7 network comprise Service Switching Points (SSP), Service Transfer Points (STP), and Service Control Points (SCP).

The hardware and software functions of the SS7 protocol are divided into functional abstractions called "levels." These levels map loosely to the Open Systems Interconnect (OSI) seven-layer model defined by the International Standards Organization. The lowest level, or Message Transfer Part (MTP) is divided into three sub-levels. The lowest level, MTP Level 1, is equivalent to the OSI Physical Layer. MTP Level 1 defines the physical, electrical, and functional characteristics of a digital signaling link. The next level, MTP Level 2, insures accurate end-to-end transmission of a message across the signaling link. Thus, MTP Level 2 implements flow control, message sequence validation, and error checking. MTP Level 2 is equivalent to the OSI Data Link Layer. Finally, MTP Level 3 provides message routing between signaling points in the SS7 network. MTP Level 3 re-routes traffic away from failed links and signaling points, and controls traffic when congestion occurs. MTP Level 3 is equivalent to the OSI Network Layer.

Within MTP Level 2, an SS7 message is called a Signal Unit (SU). There are three kinds of signal units: Fill-In Signal Units (FISUs), Link Status Signal Units (LSSUs), and Message Signal Units (MSUs). MSUs carry all network management, control, database query and response, and network maintenance data in the Signaling information Field (SIF). MSUs have a routing label which allows an originating signaling point to send information to a destination signaling point across the network. The SIF in an MSU contains the routing label and signaling information.

The Signaling Connection Control Part (SCCP) Level provides connectionless and connection-oriented network services and global title translation capabilities above MTP Level 3. The SCCP Level is loosely equivalent to the OSI transport layer. While MTP Level 3 provides point codes to allow messages to be addressed to specific signaling points, the SCCP provides subsystem numbers to allow messages to be addressed to specific applications (called subsystems) at the signaling points. The SCCP also provides the means by which an STP can perform global title translation, wherein the destination signaling point and subsystem number are determined from digits present in the signaling message. Because an STP provides global title translation, originating signaling points do not need to know the destination point code or subsystem number of the associated service. Only the STPs need to maintain a database of destination point codes and subsystem numbers associated with specific services and possible destinations.

SCCP messages are contained within the Signaling Information Field (SIF) of an MSU. The SIF contains the routing label followed by the SCCP message content. The SCCP message is comprised of a one-octet message type field followed by the mandatory fixed-part, mandatory variable part, and an optional part. Each optional part parameter is identified by a one-octet parameter code followed by a length indicator (i.e., "octets to follow") field.

The Transaction Capabilities Applications Part (TCAP) Layer sits on top of the SCCP Level and supports the exchange of non-circuit related data between applications across the SS7 network. The SCCP is used as the transport layer for TCAP-based services. For example, in mobile networks, TCAP carries Mobile Application Part (MAP) messages sent between mobile switches and databases to support user authentication, equipment identification, and roaming.

The TCAP Layer enables the deployment of advanced intelligent network services by supporting non-circuit related information exchange between signaling points using the SCCP connectionless service. For example, an SSP uses the TCAP Layer to query an SCP to determine the routing numbers associated with a dialed "800" number. The SCP also uses the TCAP layer to return a response containing the routing numbers (or an error or reject component) back to the SSP. Similarly, when a mobile subscriber roams into a new Mobile Switching Center area, the integrated Visitor Location Register requests service profile information from the subscriber's Home Location Register using MAP information carried within TCAP messages.

TCAP messages are contained within the SCCP portion of an MSU. A TCAP message comprises a transaction portion and a component portion. The transaction portion contains the package type identifier (e.g., query with permission, conversation with permission, etc.). The component portion contains components, such as Invoke (Last), Return Result (Last), Return Error, and Reject. Components include parameters containing application-specific data carried unexamined by TCAP Layer.

Since the Length Indicator (LI) portion of the MSU is limited to values between 0 and 63, a LI of 63 indicates that the message length is equal to or greater than 63 octets (up to a maximum of 272 octets). The maximum length of a signal unit is therefore 279 octets: 272 octets (data)+1 octet (flag)+1 octet (Backward Sequence Number+Backward Indicator Bit)+1 octet (Forward Sequence Number+Forward Indicator Bit)+1 octet (LI+2 bits spare)+1 octet (Service Information Octet)+2 octets (Cyclic Redundancy Check). The problem addressed by the present invention arises when message data length exceeds the 272 octets allowed by a MSU.

Currently, for TCAP messages having lengths of greater than 272 characters (derived from an application operating within a signaling node), the SCCP Layer will act to divide the message data length into portions which are 272 octets long, or less. When the entire message data can be carried in a single MSU, the message is known as a Unitdata Message (UDT). When the message length is such that multiple MSUs are required to transport the message, the individual MSUs are known as Extended Unitdata Messages (XUDTs).

Unfortunately, the SCCP Layer in older nodes does not provide a useful return result when presented with an XUDT message. For example, when a QUALREC message having more than 272 characters of message data is sent to an older SCCP node, no qualrec_return_result (or return_result or reject) message is returned to the sending node. Instead, such nodes discard XUDT messages. The application layer in the network is not aware of exactly why no return result message was obtained; the application is typically only able to indicate that there is a problem with the network communications. Thus, the failure to return a result may be characterized as a network noise problem, a hardware failure in the receiving node, or any number of other problems. The true cause of the error, which is the inability of the receiving node to properly process XUDT segmented messages provided by the SCCP, is not communicated to the sending node.

Therefore, what is needed, is a system and method supporting message transport and segmentation in a communications network having a plurality of nodes, wherein some of the nodes are capable of processing segmented messages, and other nodes are incapable of processing such messages. The system and method should be inexpensive to implement and relatively robust in operation. Further, the system and method should support testing and recordation of message segmentation and transport capability within the network.

Finally, a node supporting message transport and segmentation within a communications network is also needed. The node should have the capability of testing and recording the ability of other nodes to transport and segment long messages. The system, method, and node of the present invention should all support message transport and segmentation using the OSI model, and more particularly, the SS7 protocol standard.

SUMMARY OF THE INVENTION

The present invention solves the foregoing problems arising from long messages passed between nodal entities which may not be capable of processing such messages by providing a node, a system, and a method for message transport and segmentation in a communications network. The node capable of supporting message transport and segmentation comprises a memory with a database for storing segmentation support capability test results. The memory includes a program module which sends segmentation support test messages to other nodes and receives segmentation support response messages. The program module is also capable of sending regular (non-test) segmented messages, and capable of receiving segmented messages.

The system of the present invention, capable of supporting message transport and segmentation in a communications network having a plurality of nodes, comprises a first node and a second node. The first node has a memory with a database for storing a plurality of segmentation support capability test results which are obtained when the first node sends a segmentation support test message and receives a segmentation support response message from the tested node (i.e., the second node). If the response message is received by the first node, indicating a positive result, then the tested node is capable of receiving segmented messages. If no response message is received, indicating a negative result, then the tested node is not capable of receiving segmented messages. The second node is in electronic communication with the first node, is capable of receiving segmented messages, including segmentation support test messages, and is also capable of sending segmentation support response messages to the first node.

The nodes of the present invention may be SSPs, STPs, or SCPs. The segmented message sent between the nodes can be a SCCP message, which may, in turn, include a Segment Number field coded with a value indicating the number of segmented messages remaining to be received by the receiving node. The segmentation support test and response messages may be TCAP messages.

The method of the present invention, capable of supporting message transport and segmentation in a communications network having a plurality of nodes, comprises the steps of sending a segmentation support test message from a first node to a second node, sending a segmentation support response message from the second node to the first node, and sending a segmented message from the first node to the second node (when the segmentation support capability test result indicates that the second node is capable of receiving segmented messages). Typically, the method includes the step of recording the segmentation support capability result in a database contained in the memory in the first node. Of course, if the segmentation support capability test result indicates that the second node is not capable of receiving segmented messages, then only non-segmented messages will be sent from the first node to the second node thereafter.

The method of the present invention will also support sending a segmentation support test message from a first node to a second node, and setting a message reception timer located within the first node to count down while waiting for a response from the second node. If no response message is received by the first (sending) node before the timer counts down to a value of zero, then only non-segmented messages will be sent from the first node to the second (receiving) node. In addition, the method includes the step of recording in the database that the second node is not capable of receiving segmented messages when the message reception timer counts down to a zero value over a preselected amount of time after waiting for receipt of a segmentation support response message.

BRIEF DESCRIPTION OF THE DRAWINGS

A more complete understanding of the method and apparatus of the present invention may be acquired by reference to the following Detailed Description when taken in conjunction with the accompanying drawings, wherein.

DETAILED DESCRIPTION

Figure 1:
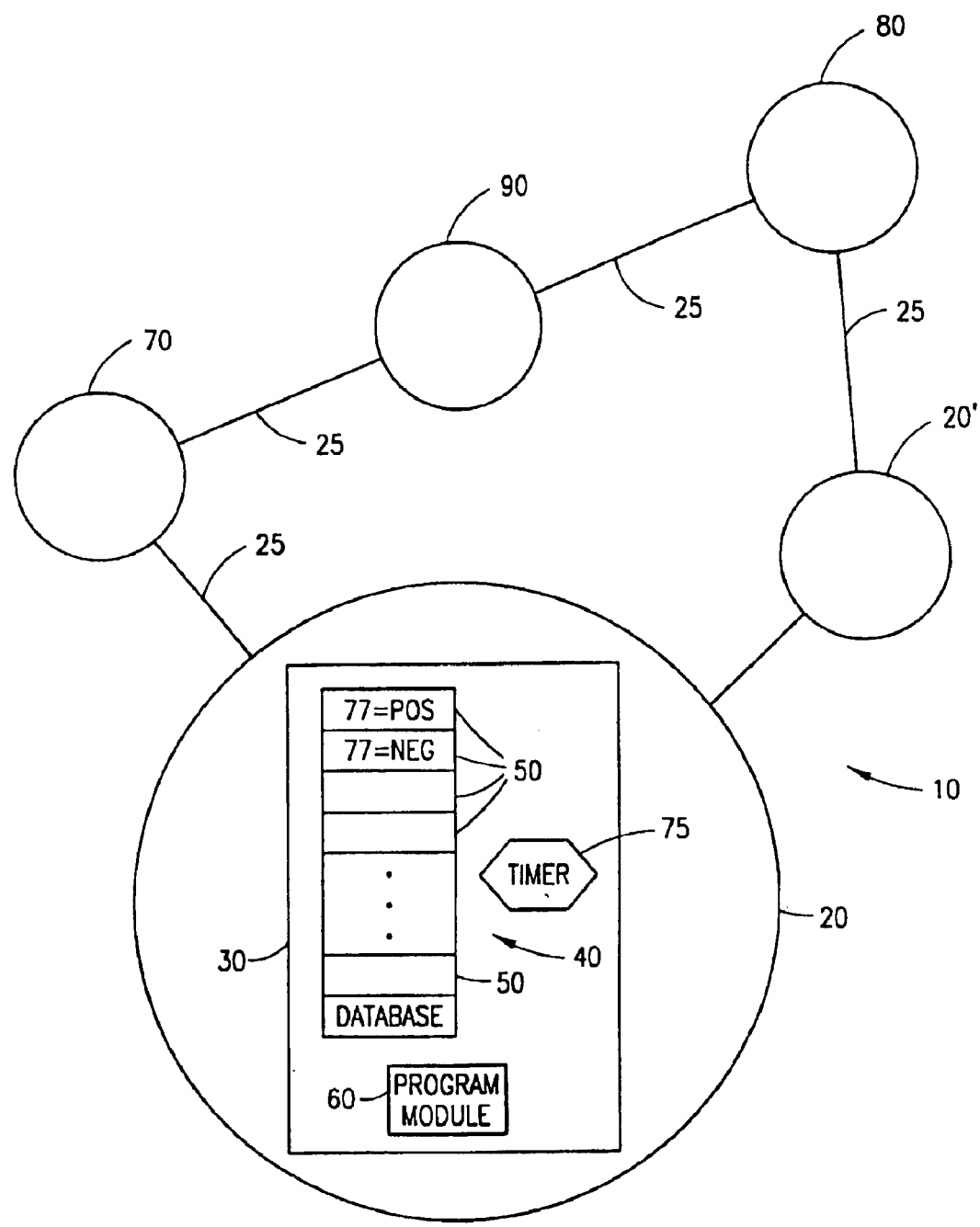
FIG. 1 is a block diagram illustrating a network and node comprising the apparatus of the present invention.

Turning now to FIG. 1, a block diagram illustrating the node 20 comprising the apparatus of the present invention can be seen. Typically, a plurality of nodes 20, 20', 70, 80 and 90 are interconnected using signaling links 25 as part of a communications network 10. For the purposes of describing the present invention, nodes 20, 20' are identical in capability (i.e., each of the nodes 20, 20' is capable of implementing the method of the present invention), but are physically or functionally distinct. Node 70 is capable of responding to segmented test messages from node 20. Node 80 is incapable of responding to test messages, and will not support reception of segmented messages. The capability of node 90 is unknown for the purposes of illustrating the operation of the present invention.

The node 20 comprises a memory 30 including a database 40 for storing the results of testing by the node 20 within the network 10. The node 20 maintains the database 40 by sending out segmentation support test messages to other nodes 20' in the network 10 and waiting for receipt of segmentation support response messages indicating that the other nodes 20' are capable of supporting receipt of segmented messages. In this case, a "segmented message" may be defined as some part of an integral message whose total length is longer than that permitted for transport as a whole by the protocol operating within the network 10. For example, in the case of the SS7 protocol, the message character data length limit is 272 octets, or characters, and the integral message length (carried over several segmented messages) would therefore be 273 octets, or greater.

If the node 20' receiving a segmentation support test message from the node 20 returns a segmentation support response message, indicating a positive test result, then the node 20 will record the positive result, marking node 20' as capable of receiving segmented messages, in the database 40. This positive result is generated and stored as one of a plurality of segmentation support capability test results 50. The memory 30 also includes a program module 60 which is capable of sending and receiving segmented messages, segmentation support test messages, and segmentation support response messages.

A timer 75, also known as a segmentation capability return result message reception timer 75, is contained within the node 20, and can be maintained as a part of the memory 30. The timer 75 is used to count down to a value of zero from some preselected amount of time which begins whenever a segmentation support test message is sent to another node (e.g. node 80), such that the node 20 may resume message transport activity even if no segmentation support response message is received by the node 20 from the tested node 80. If such is the case, then the node 20 will assume that the node 80 is not capable of receiving segmented messages, and only non-segmented messages will be sent from the node 20 to the node 80 thereafter. The node 20 will act to generate and record in the database 40 an indication (i.e., a negative support capability test result) that the node 80 is not capable of receiving segmented messages.

The node 20 will typically search the database 40 to determine whether the destination node for any particular long message (e.g., an SCCP XUDT message) has the capability of receiving a segmented message. Thus, no time is wasted testing the destination node 20' if the capability is already recorded in the database 40.

The general functionality of the node 20 is equivalent to, or identical to, any number of different nodal entities commonly operating within communications networks. For example, the node may be a signaling point, such as an SSP, an STP, or an SCP; the node may also be a Home Location Register (HLR), a Visitor Location Register (VLR), or a Mobile Switching Center (MSC).

When implementing the invention using the SS7 protocol, the segmented messages may be SCCP messages, which include a Segment Number field Coded with a value indicating the number of segmented messages remaining to be received by the node. The segmentation support test and response messages may be TCAP messages.

Figure 2:
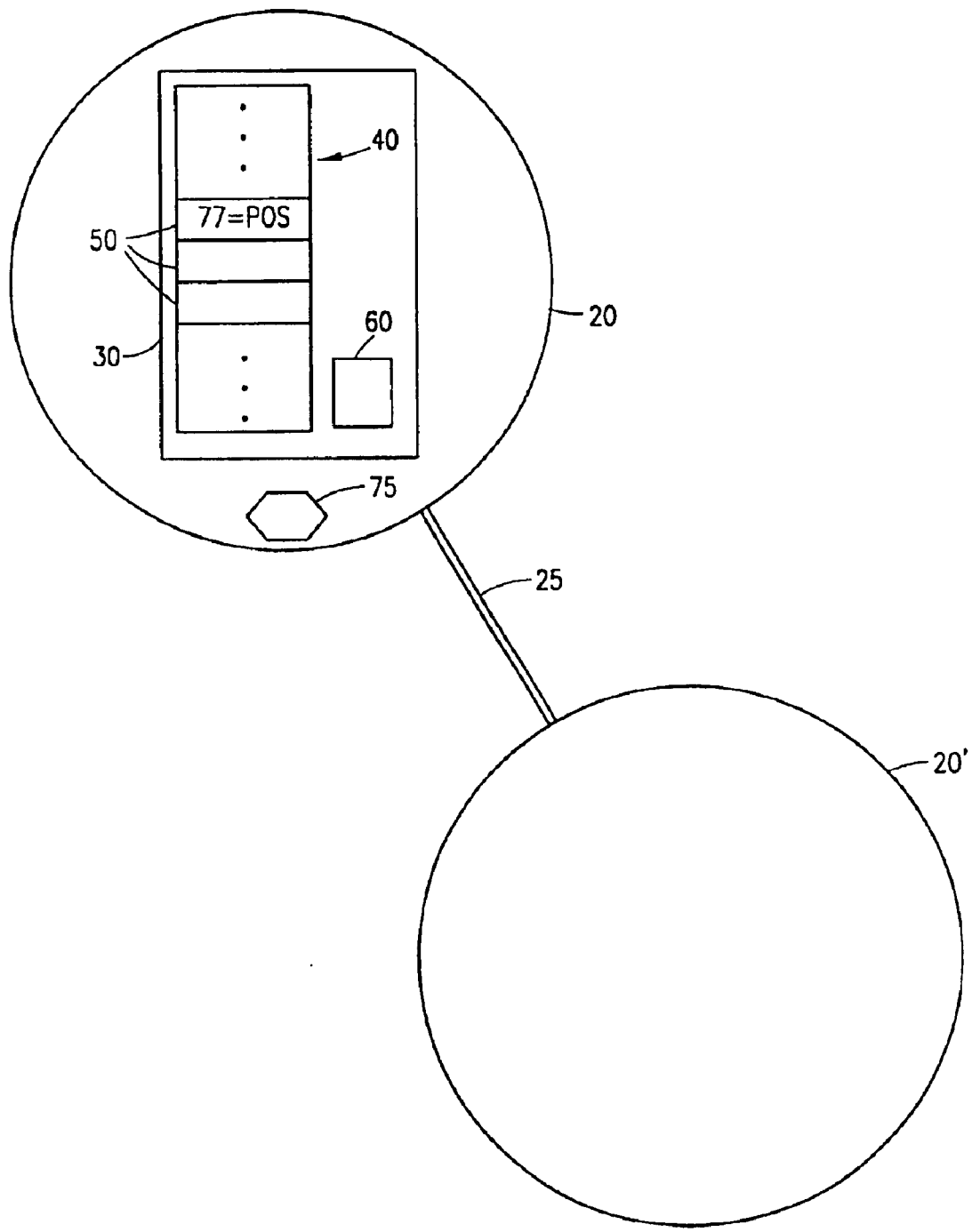
FIG. 2 is a block diagram illustrating the system of the present invention.

Turning now to FIG. 2, a block diagram illustrating the system of the present invention capable of supporting message transport and segmentation in a communications network can be seen. The system comprises a first node 20 having a memory 30 which includes a database 40 for storing a plurality of segmentation support capability test results 50. The node 20 may also comprise a program module 60 and a timer 75, as described previously. The first node 20 is adapted to send a segmented message, including a segmentation support test message. The first node 20 is also adapted to receive a segmentation support response message, and to generate a segmentation support capability test result 77.

The second node 20' is in electronic communication with the first node 20 by way of a signaling link 25. The second node 20' is adapted to receive segmented messages and segmentation support test messages, and to send a segmentation support response message. In this case, if the first node 20 sends a segmentation support test message to the second node 20', then the generated segmentation support capability test result 77 will be positive, which indicates that the second node 20' is capable of receiving segmented messages.

Figure 3:
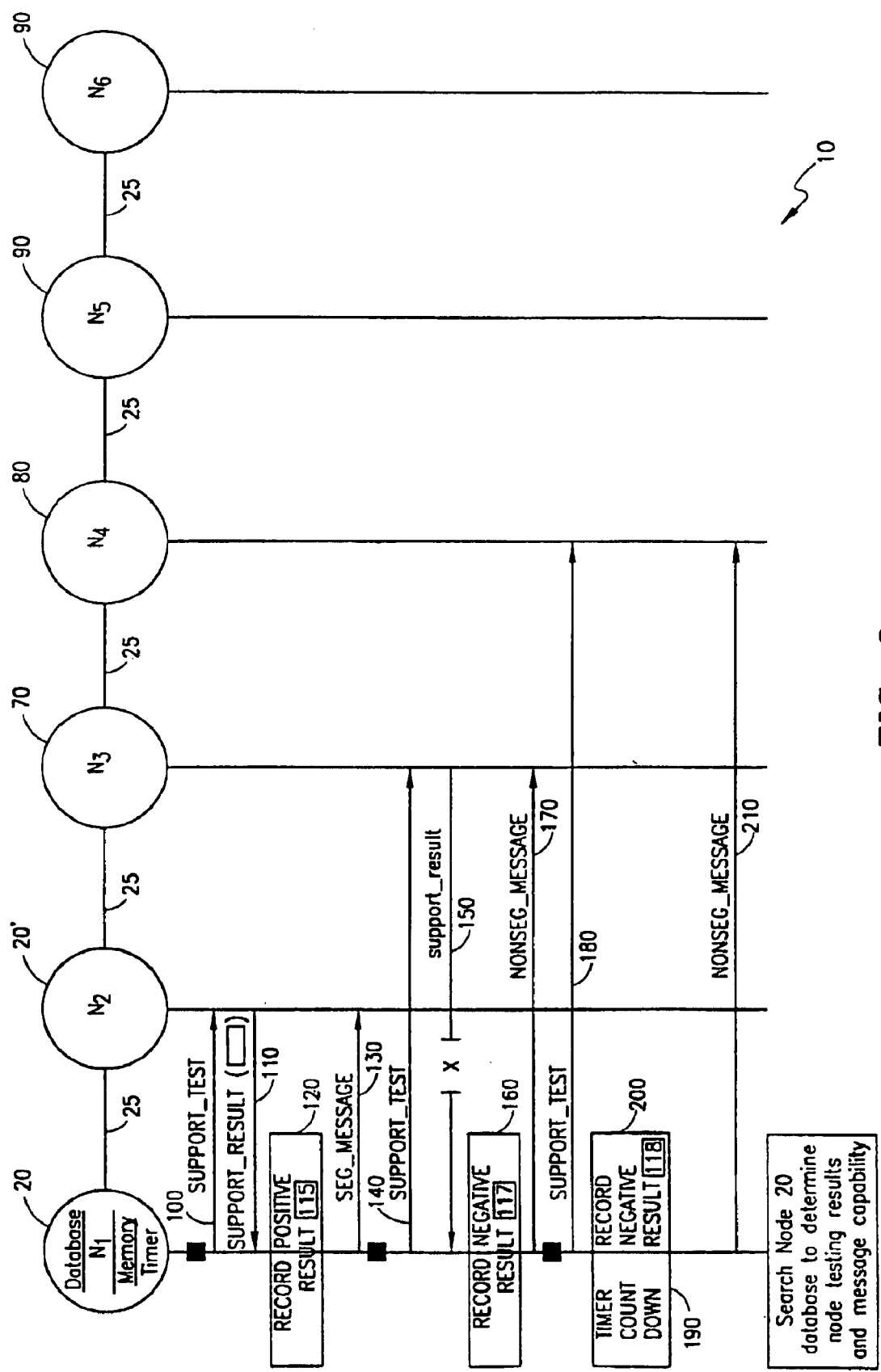
FIG. 3 is a signal flow and nodal operation diagram illustrating the method of the present invention.

Turning now to FIG. 3, a signal flow and nodal operation diagram illustrating the method of the present invention can be seen. As described and illustrated in FIG. 1, the memory 30 of the first node 20 includes a database 50 for storing a plurality of segmentation support capability test results 77. In this case, there are a plurality of nodes 20, 20', 70, 80, and 90 within the communications network 10. The first node 20 comprises a memory and timer, and is identical to the node 20 described and illustrated in FIG. 1.

The method begins by sending a first segmentation support test message 100 from the first node 20 to the second node 20'. The method continues with the step of sending a segmentation support response message 110 from the second node 20' to the first node 20 in response to receiving the first segmentation support test message 100. Receiving the segmentation support response message 110 results in generating a positive segmentation support capability test result 115, which signifies that the second node 20' is capable of receiving segmented messages. Typically, the method continues by including the step of recording the positive segmentation support capability test result 115 in the database of node 20 at step 120, and the method concludes with sending a segmented message from the first node 20 to the second node 20' at step 130.

After a node 20' is tested, and its capabilities are recorded in the database of node 20, the testing sequence may thereafter be obviated by searching the database within the node 20 to determine whether the node 20' has been tested, and if so, whether it is capable of receiving segmented messages at step 220.

The method of the present invention may also include the steps of sending a segmentation support test message 140 from the first node 20 to a third node 70. If the third node 70 is incapable of supporting message segmentation, then a segmentation support response message 150 will not be received by the first node 20, which results in generating a negative segmentation support capability test result 117. In fact, no segmentation support response message 150 at all is sent from the third node 70 to the first node 20. In this case, the negative segmentation support capability test result 117 generated by the node 20 indicates that the third node 70 is not capable of receiving segmented messages. The negative result 117 may then be recorded in the database of node 20 at step 160. Thereafter, nonsegmented messages will be sent from the first node 20 to the third node 70, shown at step 170. Again, once the message segmentation support capability of the third node 70 is known and recorded within the database of node 20, the steps of testing for message segmentation support may be obviated by implementing a search of the database at step 220 to determine before testing whether the third node 70 is capable of receiving segmented messages.

Another embodiment of the method of the present invention makes use of a timer 75 within the node 20. In response to sending a segmentation support test message at step 180 to the node 80 from the node 20, the timer 75 within the node 20 counts down to value of zero at step 190. No segmentation support response message is received from the node 80. Typically, a negative segmentation support capability test result 118 will be generated and recorded at step 200 in the database of the node 20, indicating that the node 80 is not capable of receiving segmented messages. In this case, where the node 20 fails to receive a segmentation support response message from the node 80 in response to the segmentation support test message after a timeout by the timer in the node 20, only non-segmented messages will be sent from the node 20 to the node 80 thereafter, as shown in step 210.

As noted above, the nodes 20, 20', 70, 80, and 90, can function as SSPs, STPs, or SCPs. The segmented messages may be SCCP messages, which include a Segment Number Field coded with a value indicating the number of segmenting messages remaining to be received by the receiving node. The segmentation support test and response messages may be TCAP messages.

It should be noted that the segmentation support test messages described previously may be UDT or XUDT messages. If the receiving node supports message segmentation, then responses to either UDT or XUDT segmentation support test messages will be received in either case. If the receiving nodes do not support segmentation, then no response will be received, and the internal database will be updated accordingly.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the scope of the invention as set forth and defined by the following claims.

What is claimed is:

1. A node supporting message transport and segmentation in a communications network having a plurality of nodes, comprising:

a memory including a database for storing a plurality of segmentation support capability test results, wherein the memory further includes a program module adapted to send a first segmented message, a first segmentation support test message, and a first segmentation support response message, and to receive a second segmented message, a second segmentation support test message, and a second segmentation support response message wherein the second segmented message is a Signaling Connection Control Part (SCCP) message including a Segmented Number Field coded with a value indicating the number of segmented messages remaining to be received by the node.

2. The node of claim 1, wherein the node is selected from the group consisting of a service switching point, a signal transfer point, or a service control point.

3. The node of claim 1, wherein the segmentation support test and response messages are Transaction Capability Application Part (TCAP) messages.

4. A system supporting message transport and segmentation in a communications network having a plurality of nodes, comprising:

a first node having a memory including a database for storing a plurality of segmentation support capability test results, wherein the first node is adapted to send a segmented message and a segmentation support test message, and to receive a segmentation support response message; and a second node in electronic communication with the first node, wherein the second node is adapted to receive the segmented message and the segmentation support test message, and to send the segmentation support response message wherein the second segmented message is a Signaling Connection Control Part (SCCP) message including a Segmented Number Field coded with a value indicating the number of segmented messages remaining to be received by the second node.

5. The system of claim 4, wherein the first node and second nodes are each selected from the group consisting of a service switching point, a signal transfer point, or a service control point.

6. The system of claim 4, wherein the segmentation support test and response messages are Transaction Capability Application Part (TCAP) messages.

7. A method supporting message transport and segmentation in a communications network having a plurality of nodes, comprising the steps of:

sending a first segmentation support test message from a first node to a second node, the first and second nodes selected from the plurality of nodes, the first node comprising a memory including a database for storing a plurality of segmentation support capability test results;

sending a first segmentation support response message from the second node to the first node in response to receiving the first segmentation support test message;

generating a first segmentation support capability test result indicating that the second node is capable of receiving segmented messages; and sending a segmented message from the first node to the second node wherein the second segmented message is a Signaling Connection Control Part (SCCP) message including a Segmented Number Field coded with a value indicating the number of segmented messages remaining to be received by the second node.

8. The method of claim 5, including the step of recording the first segmentation support capability test result in the database.

9. The method of claim 7, including the step of searching the database to determine whether the second node is capable of receiving segmented messages.

10. The method of claim 7, including the steps of sending a second segmentation support test message from the first node to a third node, the third node selected from the plurality of nodes;

failing to receive a second segmentation support response message sent from the third node to the first node in response to the second segmentation support test message;

generating a second segmentation support capability test result indicating that the third node is not capable of receiving segmented messages; and sending a non-segmented message from the first node to the third node.

11. The method of claim 10, including the step of recording the second segmentation support capability test result in the database.

12. The method of claim 7, wherein the first node and second nodes are each selected from the group consisting of a service switching point, a signal transfer point, or a service control point.

13. The method of claim 7, wherein the first segmentation support test and response messages are Transaction Capability Application Part (TCAP) messages.

14. The method of claim 7, wherein the first node includes a segmentation capability return result message reception timer, Including the steps of:

sending a second segmentation support test message from the first node to a third node, the third node selected from the plurality of nodes;

starting the segmentation capability return result message reception timer counting down to a zero value over a preselected amount of time;

failing to receive a second segmentation support response message sent from the third node to the first node in response to the second segmentation support test message before the segmentation capability return result message reception timer reaches the zero value;

generating a second support capability test result indicating that the second node is not capable of receiving segmented messages; and sending a non-segmented message from the first node to the third node.

15. The method of claim 14, including the step of recording in the second support capability test result in the database.

16. The method of claim 14, including the step of searching the database to determine whether the second node is capable of receiving segmented messages.

* * * * *

UNITED STATES PATENT AND TRADEMARK OFFICE
CERTIFICATE OF CORRECTION

| | | |
|---|---|---|
| PATENT NO. | : 6,954,458 B1 | Page 1 of 1 |
| APPLICATION NO. | : 09/395078 | |
| DATED | : October 11, 2005 | |
| INVENTOR(S) | : Eduardo T. Sanchez | |

It is certified that error appears in the above-identified patent and that said Letters Patent is hereby corrected as shown below:

On the Title Page, item (56), under "U.S. PATENT DOCUMENTS", Column 1, Line 5, delete "714/14" and insert -- 714/4 --, therefor.

On the Title Page, item (57), under "ABSTRACT", Column 2, Line 13, after "receive the" insert -- segmented message and the segmentation support test message, and to send the --.

In Column 8, Line 16, in Claim 1, after "message" insert -- , --.

In Column 8, Line 41, in Claim 4, after "message" insert -- , --.

In Column 9, Lines 1 – 2, in Claim 7, delete "from the first node to the second node".

In Column 9, Line 2, in Claim 7, insert -- , -- before "wherein".

In Column 9, Line 6, in Claim 7, after "second node" insert -- from the first node to the second node --.

In Column 9, Line 7, in Claim 8, delete "claim 5" and insert -- claim 7 --, therefor.

In Column 10, Line 6, in Claim 14, delete "Including" and insert -- including --.

Signed and Sealed this

Sixth Day of May, 2008

JON W. DUDAS
*Director of the United States Patent and Trademark Office*